Dec. 31, 1968 R. E. WOODS 3,418,716
INTERPROXIMAL WEDGING DEVICE
Filed Feb. 3, 1966

INVENTOR
ROBERT E. WOODS
BY *Shanley & O'Neil*
ATTORNEYS though the device can be made of any suitable material, such as plastic or metal, it has been found that wood is a most convenient material because of its ease of fabrication and its ability to be readily cut to size.

United States Patent Office 3,418,716
Patented Dec. 31, 1968

3,418,716
INTERPROXIMAL WEDGING DEVICE
Robert E. Woods, 206 W. Chestnut,
Butler, Mo. 64730
Filed Feb. 3, 1966, Ser. No. 524,708
6 Claims. (Cl. 32—64)

ABSTRACT OF THE DISCLOSURE

Device for positioning dental matrices to prevent overhang of dental filling into interproximal space. The device includes a hub and a plurality of matrix-securing wedges radiating outwardly from the hub. The wedges are of different sizes to provide in one device a selection of wedges of varying sizes, so that the dentist need not stop a dental operation to fabricate or sort through a collection of wedges to find a wedge meeting size requirements for interproximal space encountered in the dental operation. A projection from the hub facilitates manipulation of the device.

---

This invention relates to dentistry, and more particularly, to a dental matrix positioning device for preventing gingival overhang of dental filling.

In making a restoration or filling of a cavity in the side of a tooth, it is necessary to utilize a dental matrix tightly secured around the tooth to provide an external wall for the cavity to prevent the flow of dental filling out of the cavity through the open side. These matrices take the form of flexible bands which are pulled tightly around the tooth and held by a clamp called a matrix retainer.

When the matrix is applied to the tooth, the contour of the tooth, tapering as it does from the crown to the neck, prevents the matrix from maintaining uniform contact with the surface of the tooth. Although there may be a snug fit at a wider portion of the tooth, where the tooth tapers inwardly the fit will be looser and create the danger that a portion of the dental filling will escape and solidify to form an overhang. This overhang of filling over the gingival or gum tissue may become a repository for food particles and other tartar-forming agents, a condition which, if left uncorrected, may lead to localized gingivitis and recurrent decay, with eventual loss of the tooth.

When there is no tooth adjacent the tooth being filled, or when the cavity is on the buccal or lingual side of the tooth, the dentist can easily locate any filling overhang by visual inspection and readily trim away the excess filling forming the overhang. However, when the cavity is in a proximal surface of a tooth, that is to say, a tooth surface which has another tooth adjacent thereto, filling overhang into the space between teeth, or interproximal space, is difficult to locate and difficult to remove.

In order to solve the problem created by the overhang of filling, one approach has been to manufacture matrices which supposedly conform to the anatomical configuration of the tooth. This expedient has not been successful in all instances because of the wide variation in tooth contour. Certain teeth are very narrow at the neck, yet contour sharply to a wide crown. To prevent filling overhang in restoring the proximal surface of such teeth, a technique has been devised in which a wedge is inserted into the interproximal space to force the matrix tightly against the proximal surface of the tooth and prevent the gingival overhang of filling.

Wedges for this purpose have been commonly homemade by dentists, as by cutting from a toothpick or the like, and have been commercially prepared from wood and plastic and supplied in various sizes to meet the varying sizes of interproximal spaces. Both types have disadvantages. As previously noted, there is wide variation in the contour of teeth from the crown to the neck. As a result, a dentist who cuts his own wedges must take the time to whittle a wedge to fit the individual interproximal space with which he is working, determining when he has made a wedge that is of a suitable size by the trial-and-error method. The dentist who uses commercially supplied wedges is in little better condition, because he must sort through a collection of wedges to determine, again by the trial-and-error method, when he has located one of a suitable size. Both of these techniques are time-consuming and prolong the discomfort of the patient in the chair.

Therefore, a main object of this invention is to provide an improved dental matrix positioning device which overcomes the disadvantages of prior art wedges.

The foregoing and other objects are accomplished by the invention, which can be briefly described as a dental matrix positioning device which comprises a hub and a plurality of wedge means associated with the hub, for securing a matrix against the proximal surface of a tooth, each wedge means being of a size different from that of every other wedge means associated with the hub.

Other features, objects and advantages of the invention will appear more fully from the following detailed description which, when considered in conjunction with the accompanying drawings, discloses several embodiments of the invention for purposes of illustration only and not for definition of the limits of the invention. For determining the scope of the invention, reference may be had to the appended claims.

In the drawing, wherein similar reference characters denote similar elements throughout the several views.

Figure 1:
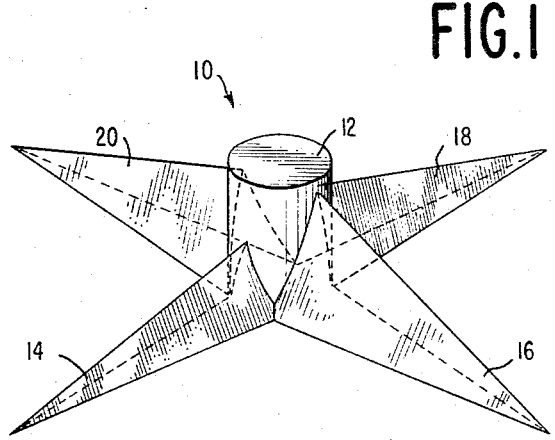
FIGURE 1 is an enlarged, perspective view of a dental matrix positioning device that forms a preferred embodiment of the invention.

Referring to the drawing in greater detail, a preferred embodiment of the invention is shown in FIGURE 1. In this embodiment, a dental matrix positioning device, indicated generally at 10, comprises a hub 12 at its central portion and wedge means associated with and radiating outwardly from the hub. In the embodiment illustrated in FIGURE 1, four wedge means, indicated at 14, 16, 18 and 20 are provided, each tapering from the hub to a point in space. Each wedge means is preferably generally triangular in cross-section with generally flat surfaces, as shown in phantom line in FIGURE 1, although it is contemplated that cross-sections of other suitable configuration may be utilized. In FIGURE 1, each wedge means, being triangular in cross-section, comprises a base and two upper surfaces converging to a point.

As is shown in FIGURE 1, each wedge means is of a size that is different from that of every other wedge means associated with the hub 12. Any convenient selection of sizes suitable for use in interproximal spaces of different dimensions may be utilized in the invention. By way of example, a preferred embodiment found to be well suited for general use was a device made according to the invention with a hub having a diameter of about 1.5 mm., a smallest wedge means with surfaces about 2 mm. wide at the hub and a largest wedge means with surfaces about 3.5 mm. wide at the hub. One intermediately sized wedge means was about 3 mm. wide at the hub and the other intermediately sized wedge means had a base surface about 2 mm. wide at its widest point and upper surfaces about 2.5 mm. wide at the hub. Each wedge means was about 11 mm. long. It is contemplated that wedging devices according to the invention may have dimensions longer and smaller than those stated.

Figure 2:
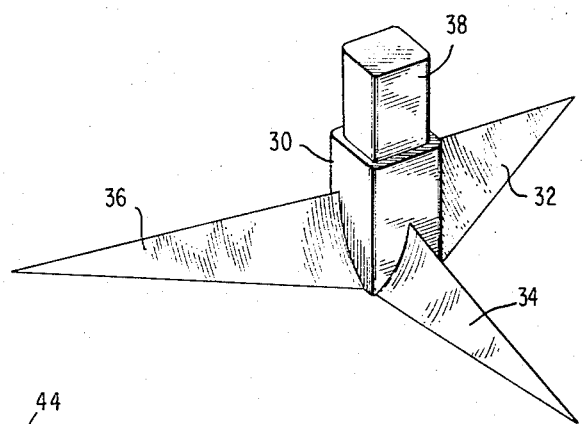
FIGURE 2 is a perspective view of a modified form of dental matrix positioning device made pursuant to the principles of the invention.

FIGURE 2 illustrates a modified form of matrix positioning device made according to the invention. In this embodiment, three wedge means 32, 34, and 36 radiate from a hub 30 which is of quadrilateral cross-section. As shown in FIGURE 2, the upper surfaces, and optionally also the base surface, of the wedge means may be made slightly concave so as to better conform to the contour of the tooth. Also provided in the embodiment illustrated in FIGURE 2 is a means such as projection 38 associated with the hub 30 for facilitating manipulation of the device with forceps or the like.

The manner of using the device is explained with reference to FIGURES 3 and 4. In these figures, tooth 40 is shown with a prepared cavity 42 in its proximal surface adjacent tooth 44. A conventional matrix 46, which may comprise a band of .002" stainless steel, is disposed around tooth 40 and clamped at 48 in a conventional manner. In order to press matrix 46 against the proximal surface of tooth 40, so that no filling will squeeze out between lower portion of cavity 42 and matrix 46 to form an overhang of filling over the gingiva 49, the dentist inserts a wedge means 50 of a matrix positioning device 51, made in accordance with the principles of the invention, into the interproximal space between teeth 40 and 44. If the first wedge means inserted is not of an appropriate size to properly force matrix 46 against the proximal surface of tooth 40, the dentist can quickly and easily rotate the device 50 so as to insert another wedge means, until the matrix 46 is properly pressed in position, all without loss of time spent in sharpening or searching for a single wedge of correct size.

Figure 3:
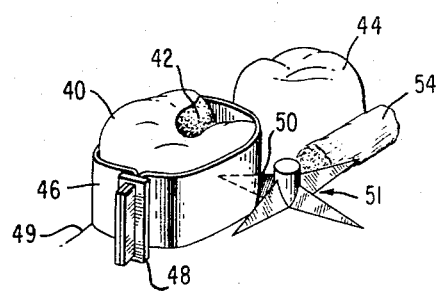
FIGURE 3 is a perspective view showing the device of FIGURE 1 in position in an interproximal space.
Figure 4:
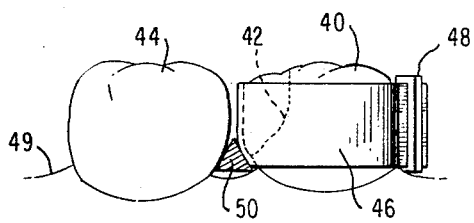
FIGURE 4 is a view in side elevation of the arrangement of FIGURE 3 with the device of the present invention shown in section.

As illustrated in FIGURE 3, the device 51 in position also serves as a useful facility for stabilizing a cotton roll as at 54. Any unused wedge means on device 51 that interferes with the dentist's operations can be quickly snipped off.

Matrix positioning devices according to the invention may be made by injection molding from an A.B.S. resin (Acrylonitrite-Butadiene-Styrene Terpolymer), although other suitable materials and methods of manufacture may be utilized. It is preferred that the devices be made in a color such as black to contrast with that of the teeth and gums.

It will be observed that matrix positioning devices made in accordance with the principles of the invention offer many advantages over the single wedges of the prior art.

The present device offers a choice of wedges of different sizes ready at hand without necessity for sharpening one or searching through an assortment of single wedges to locate a wedge of appropriate size. The device also serves as a means for stabilizing cotton rolls and cotton roll holders, used in dentistry to keep the working area reasonably free from fluids. The wedges associated with the device are preferably made in color contrasting with the background in which it is to be used, and are tough yet resilient so as to not break off between teeth.

What I claim is:

1. A dental matrix positioning device for preventing overhang of dental filling into interproximal space, comprising
 a hub, and
 a plurality of wedges for securing a dental matrix against a proximal surface of a tooth,
 said wedges radiating divergently outwardly from the hub,
 each wedge being of a size selected for insertion of the wedge into an interproximal space,
 each wedge tapering from a large end at the hub to a small end spaced away from the hub,
 at least one of said wedges being of a selected size different from that of every other of said wedges.
2. The dental matrix positioning device of claim 1,
 each of said wedges being of a size different from that of every other wedge associated with the hub.
3. The dental matrix positioning device of claim 2,
 the plurality of wedges comprising four wedges.
4. The dental matrix positioning device of claim 2,
 the plurality of wedges comprising three wedges.
5. The dental matrix positioning device of claim 1,
 each wedge having a generally triangular cross-section and having a base surface and two upper surfaces,
 the base surface and the two upper surfaces converging in a direction away from the hub.
6. The dental matrix positioning device of claim 1, including
 means projecting from the hub, for facilitating manipulation of the dental matrix positioning device.

References Cited

UNITED STATES PATENTS

| | | | |
|---|---|---|---|
| 2,090,904 | 8/1937 | Singer. | |
| 427,338 | 5/1890 | Marshall | 32—63 |

LOUIS G. MANCENE, *Primary Examiner.*

R. PESHOCK, *Assistant Examiner.*